(12) United States Patent
Brunetti et al.

(10) Patent No.: US 9,214,089 B2
(45) Date of Patent: Dec. 15, 2015

(54) AIRCRAFT CAPABLE OF HOVERING, AIRCRAFT MANEUVERING ASSIST METHOD, AND INTERFACE

(75) Inventors: Massimo Brunetti, Samarate (IT); Simone Gobbi, Samarate (IT); Dario Iannucci, Samarate (IT); Emilio Majori, Samarate (IT)

(73) Assignee: Agusta S.P.A., Samarate (IT)

( * ) Notice: Subject to any disclaimer, the term of this patent is extended or adjusted under 35 U.S.C. 154(b) by 399 days.

(21) Appl. No.: 13/112,842

(22) Filed: May 20, 2011

(65) Prior Publication Data

US 2012/0029738 A1    Feb. 2, 2012

(30) Foreign Application Priority Data

May 21, 2010    (EP) ..................................... 10425170

(51) Int. Cl.
| | |
|---|---|
| *G08G 5/00* | (2006.01) |
| *G08G 5/04* | (2006.01) |
| *G01S 13/94* | (2006.01) |
| *G05D 1/08* | (2006.01) |
| *G05D 1/10* | (2006.01) |

(52) U.S. Cl.
CPC .............. *G08G 5/045* (2013.01); *G08G 5/0078* (2013.01); *G08G 5/0086* (2013.01); *G01S 13/94* (2013.01); *G05D 1/0858* (2013.01); *G05D 1/102* (2013.01)

(58) Field of Classification Search
CPC ....... G08G 5/04; G08G 5/045; G08G 5/0078; G08G 5/0086; G08G 5/0073; G01S 13/94; G05D 1/0858; G05D 1/102; B64C 13/06; B64C 13/10

USPC .............. 701/514, 301; 342/29; 340/961, 946
See application file for complete search history.

(56) References Cited

U.S. PATENT DOCUMENTS

| | | | | |
|---|---|---|---|---|
| 5,371,581 | A * | 12/1994 | Wangler et al. | 356/5.01 |
| 5,451,957 | A * | 9/1995 | Klausing | 342/25 F |
| 7,463,183 | B2 * | 12/2008 | Reich | 342/29 |
| 8,249,762 | B1 * | 8/2012 | Flotte et al. | 701/3 |
| 2006/0055600 | A1 | 3/2006 | Reuveni et al. | |
| 2007/0050140 | A1 * | 3/2007 | Matuska et al. | 701/301 |
| 2010/0100326 | A1 * | 4/2010 | Nouvel et al. | 701/301 |
| 2010/0292871 | A1 * | 11/2010 | Schultz et al. | 701/3 |
| 2011/0133979 | A1 * | 6/2011 | Huizing et al. | 342/29 |
| 2012/0123671 | A1 * | 5/2012 | Oberti et al. | 701/301 |
| 2012/0215436 | A1 * | 8/2012 | Flotte et al. | 701/301 |

FOREIGN PATENT DOCUMENTS

DE    102006053354    5/2008

OTHER PUBLICATIONS

European Search Report for EP 10 42 5170, dated Oct. 21, 2010 (2 pages).

* cited by examiner

*Primary Examiner* — Tuan C. To
*Assistant Examiner* — Dale W Hilgendorf
(74) *Attorney, Agent, or Firm* — McCracken & Gillen LLC

(57) ABSTRACT

An aircraft capable of hovering, and characterized by having at least one sensor, which has a plane sweep region and is designed to acquire, when the aircraft is maneuvering, values of respective distances between first points on an obstacle within the plane sweep region, and a second point on the aircraft; and a control unit designed to generate an alarm signal when at least one of the first points lies within a safety region containing the second point on the aircraft.

13 Claims, 8 Drawing Sheets

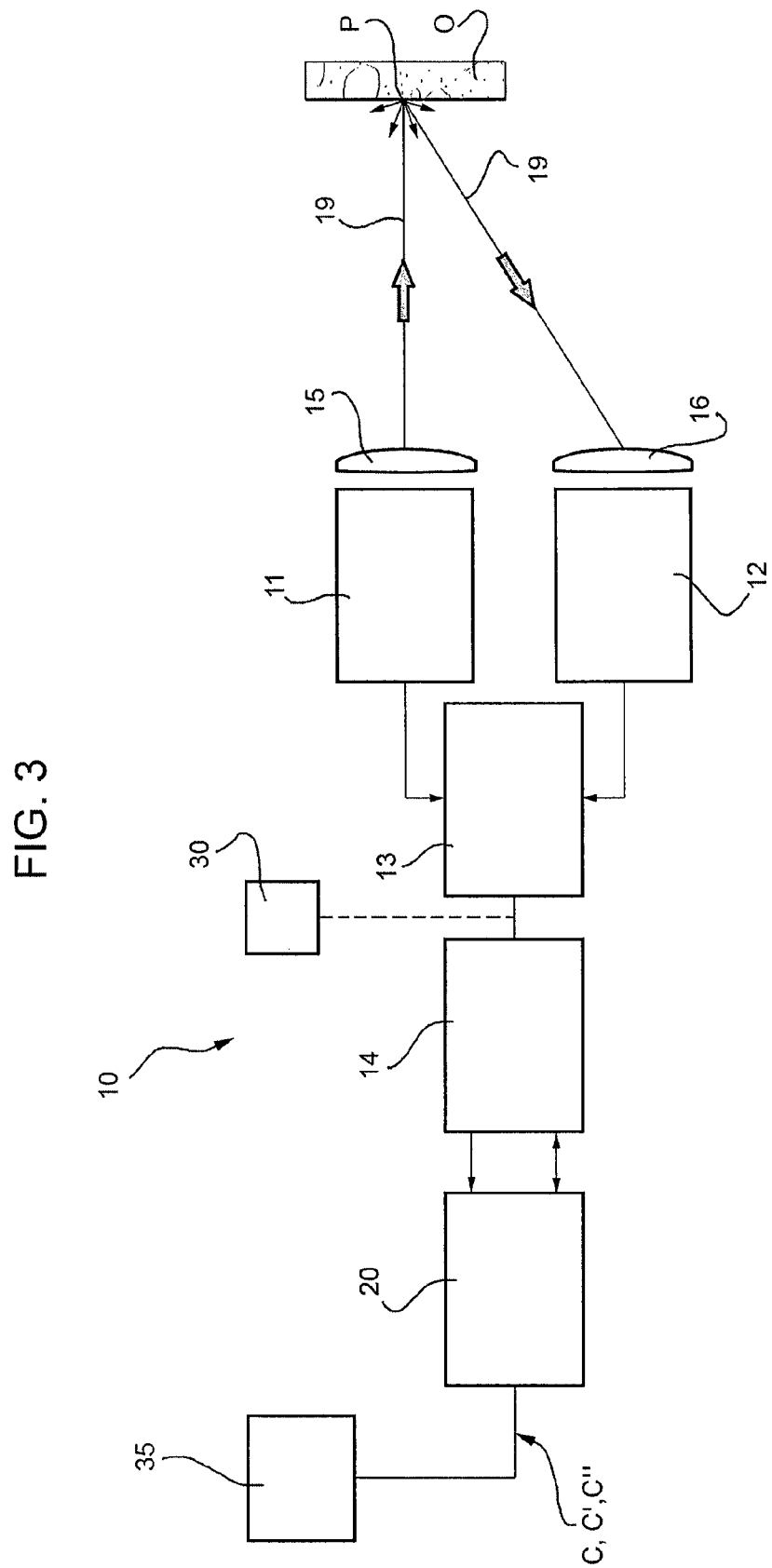

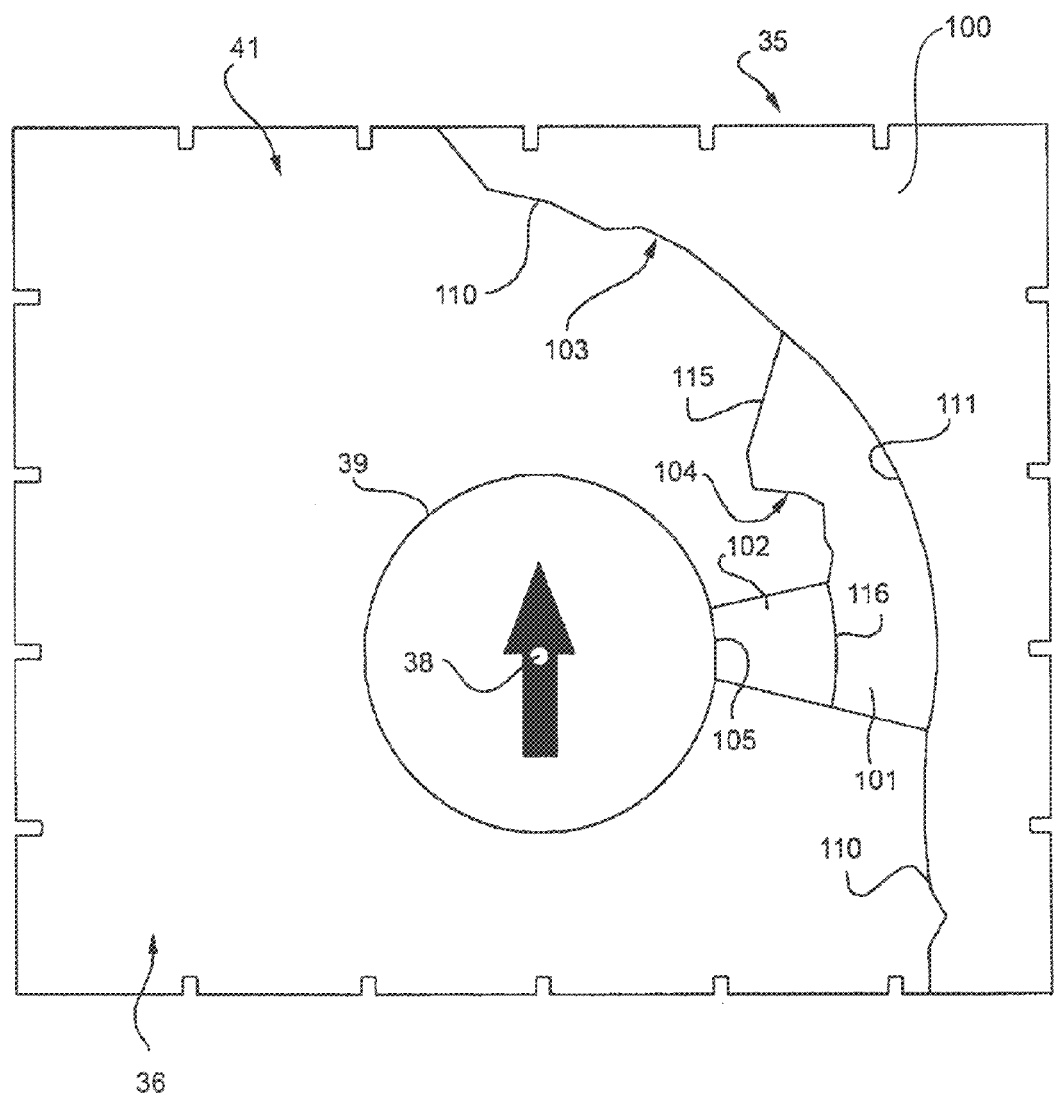

AIRCRAFT CAPABLE OF HOVERING, AIRCRAFT MANEUVERING ASSIST METHOD, AND INTERFACE

CROSS-REFERENCE TO RELATED APPLICATIONS

This application claims the benefit of European Patent Application No. 10 42 5170, filed May 21, 2010, which is incorporated by reference in its entirety herein.

FIELD OF THE INVENTION

The present invention relates to an aircraft capable of hovering, i.e. sustaining flight at constant height and substantially zero speed, and in particular to a helicopter or convertiplane.

The present invention also relates to an aircraft maneuvering assist method, e.g. for assisting maneuvering during take-off, landing or rescue operations, i.e. when the aircraft is practically hovering or at substantially zero speed in a plane perpendicular to the up or down direction.

The present invention also relates to a graphic interface.

The present invention also relates to a software product loadable onto a control unit an aircraft.

BACKGROUND ART

Hover aircraft are commonly employed when maneuvering close to fixed and/or moving obstacles, as for example when taking off and/or landing on a ship, or carrying out rescue or salvage operations in emergency situations and/or poor-access locations, such as mountain or sea rescue operations.

In such cases, an operator visually ensures the aircraft stays a given distance from the obstacle.

If the aircraft comes too close to the obstacle, thus risking collision between the blades of one of the rotors and the obstacle, the operator alerts the pilot who accordingly pulls the aircraft back.

A need is felt within the industry to safeguard against collision between the aircraft and the obstacle caused by judgment errors on the part of the operator and/or errors in communication between the operator and pilot.

U.S. Pat. No. 5,371,581 discloses an aircraft provided with a sensor which has a quasi-horizontal sweep region and designed to acquire values of distances between points of an obstacle within the sweep region and a point of the aircraft. In detail, the sensor comprises a rotating optics which protrudes from the bottom portion of the fuselage.

DE-A-102006053354 disclose an helicopter with radar detectors which are distributed at the fuselage of the aircraft.

SUMMARY OF THE INVENTION

It is an object of the present invention to provide an aircraft designed to meet this requirement in a straightforward, low-cost manner.

According to one embodiment, an aircraft capable of hovering includes a fuselage, a rotor mounted onto the top of said fuselage, and a drive shaft projecting from said fuselage and for driving said rotor. At least one sensor is provided having a plane sweep region and designed, when said aircraft is maneuvering, to acquire values of respective distances between first points on an obstacle within said plane sweep region, and a second point on said aircraft. A control unit is designed to generate an acoustic and/or visual alarm signal when at least one of said first points lies within a safety region containing said second point on said aircraft. Further, the at least one sensor surrounds said drive shaft and is located about said shaft.

According to another embodiment, a graphic interface includes display means for displaying a number of indications wherein the graphic interface is controllable by a control unit on the basis of values of respective distances between respective first points on an obstacle and a second point on an aircraft having a rotor and wherein the values are acquired by at least one sensor. The graphic interface comprises a first indication of the location of said second point, at least one second indication of the overall size of said aircraft, and a third indication of a first outline of said obstacle defined as an intersection of a plane sweep region and an outer surface of said obstacle. The graphic interface further includes a fourth indication of a second outline of a disk of said rotor, a fifth indication of a recommended backoff direction, and an area bounded by said second outline on a third indication side and by a third outline on a side opposite said third indication side. The area is representative of an area in a space close to said obstacle and from which said aircraft must be kept away. Further, the third outline comprises at least some portions representative of said first points located a distance below a threshold value from said second point.

According to yet another embodiment, a method of assisting maneuvering of an aircraft capable of hovering, wherein the aircraft includes a fuselage, a rotor mounted onto the top of said fuselage, and a drive shaft projecting from said fuselage and for driving said rotor, comprises the step of acquiring, when said aircraft is maneuvering, first values of respective first distances between first first points on an obstacle within a first plane sweep region of a first sensor, and a second point on said aircraft. The method further includes the steps of defining a safety region containing said second point on said aircraft, generating an acoustic or visual alarm signal when at least one of said first points lies within the safety region containing said second point on said aircraft, and locating said first sensor in a position in which it surrounds said drive shaft, and is about said drive shaft. A software product on a non-transitory computer readable medium is also designed, when executed, to implement the steps of such method.

BRIEF DESCRIPTION OF THE DRAWINGS

A preferred, non-limiting embodiment of the present invention will be described by way of example with reference to the accompanying drawings, in which:

FIG. 3 shows a schematic of parts of the FIGS. 1 and 2 aircraft;

FIG. 9 shows an enlarged view of further parts of the FIG. 4 interface.

DETAILED DESCRIPTION OF THE INVENTION

Figure 2:
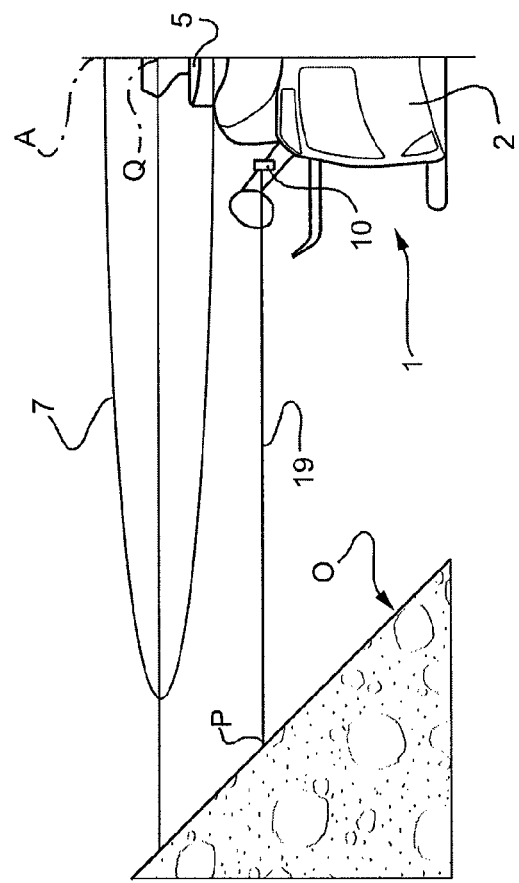
FIG. 2 shows a side view, with parts removed for clarity, of the FIG. 1 aircraft.
Figure 1:
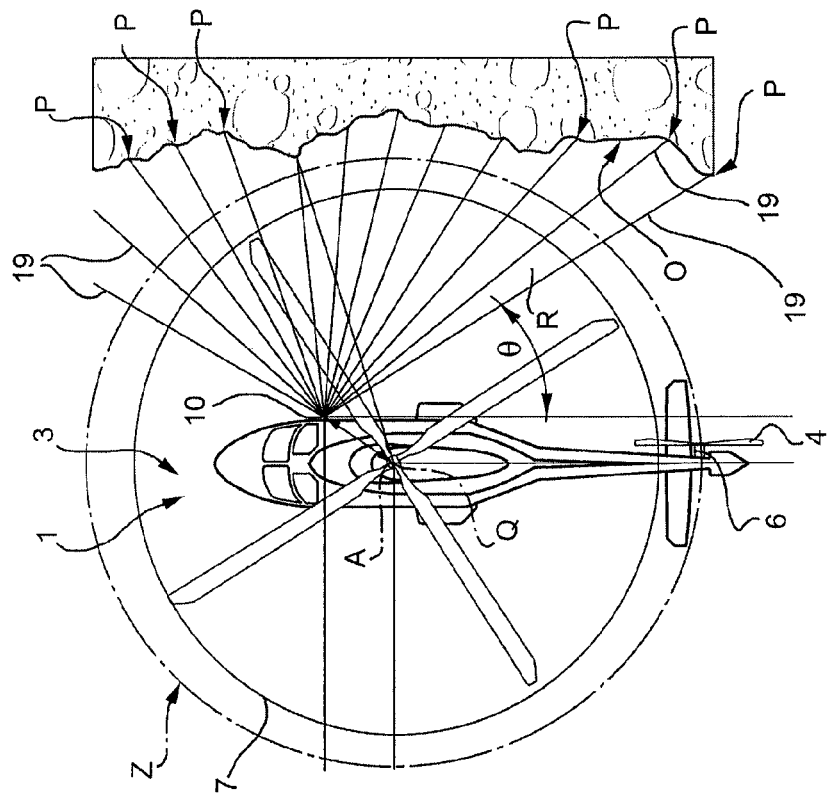
FIG. 1 shows an overhead view, with parts removed for clarity, of an aircraft in accordance with the present invention performing a substantially hovering maneuver.
Figure 8:
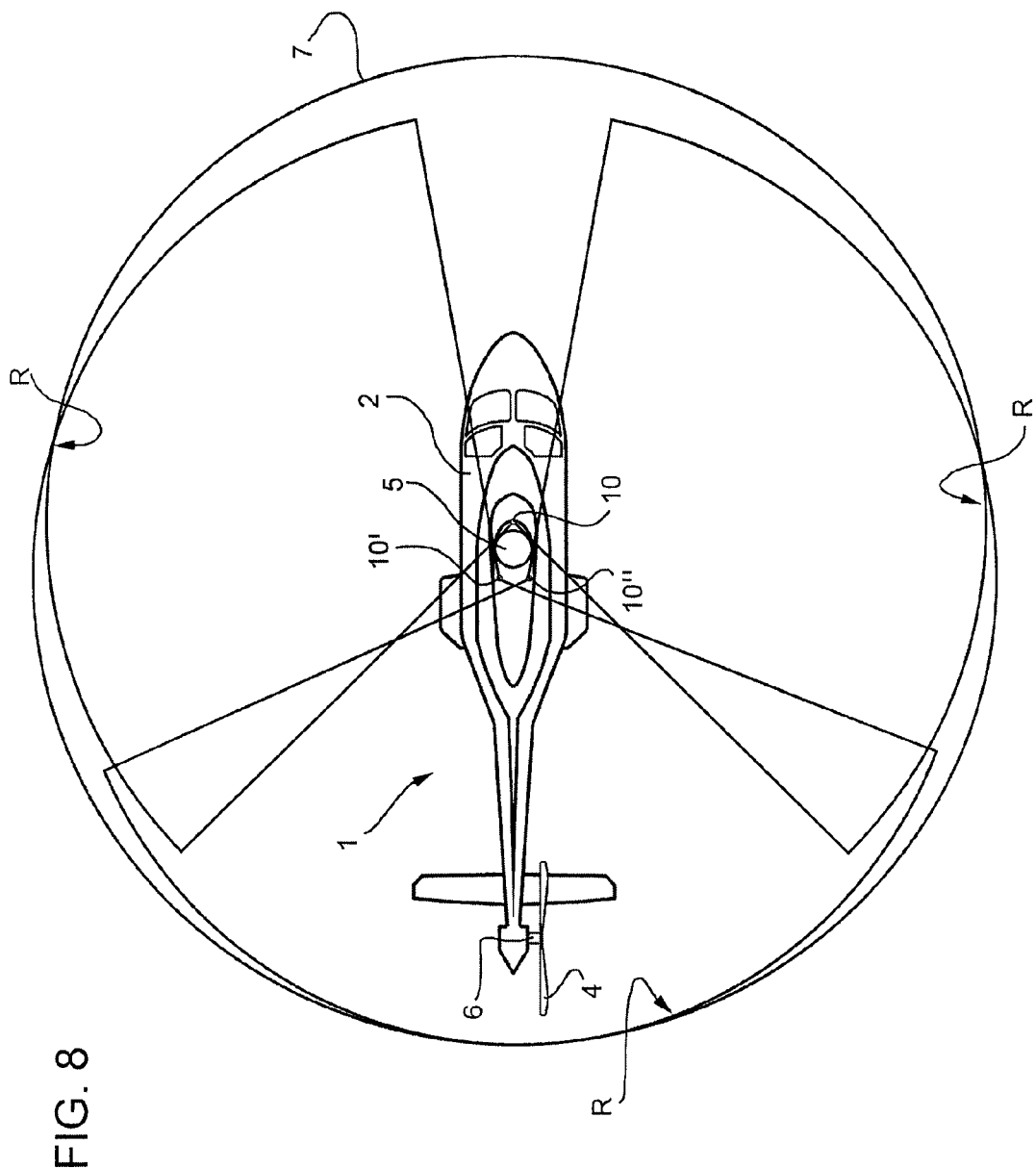
FIG. 8 shows an overhead view, with further parts removed for clarity, of the FIGS. 1 and 2 aircraft.

Number 1 in FIGS. 1, 2 and 8 indicates an aircraft capable of hovering, i.e. sustaining flight at constant height and substantially zero speed.

In the example shown, the aircraft is a helicopter.

Alternatively, aircraft 1 may be a convertiplane.

Helicopter 1 substantially comprises a fuselage 2; a main rotor 3 mounted on top of fuselage 2 to rotate about an axis A; and an antitorque tail rotor 4 projecting from a tail fin at the rear end of fuselage 2 to counteract the torque transmitted by rotor 3 to fuselage 2.

Helicopter 1 comprises a drive shaft 5 projecting from fuselage 2 (FIG. 2) and for driving rotor 3; and a drive shaft 6 projecting from the tail fin (FIG. 1) and for driving rotor 4.

Helicopter 1 comprises:
- a number of sensors 10, 10', 10" (only one shown in FIG. 1), each of which has a plane sweep region R (only one indicated in FIG. 1), and is designed to acquire, during a hovering maneuver of the helicopter, first values of the distances C, C', C" between points P on an obstacle O, and a point Q on the helicopter; and
- a control unit 20 designed to generate an alarm signal when one of points P lies within a safety region Z containing point Q.

Advantageously, each of sensor 10, 10', 10" surrounds drive shaft 5.

In the example shown, sensors 10, 10', 10" are three in number, and respective regions R lie in respective separate, parallel planes.

More specifically, sensors 10, 10', 10" are located about shaft 5 (FIG. 8); and respective regions R overlap despite lying in respective separate planes.

In the FIG. 1 example, point Q is defined by the intersection of axis A and the plane of disk 7 of rotor 3.

With reference to FIG. 3, each sensor 10 substantially comprises:
- an emitter 11 for emitting electromagnetic radiation in the plane of respective region R and onto points P on obstacle O;
- a receiver 12 for receiving the electromagnetic radiation reflected by points P on obstacle O;
- a chronometer 13 for measuring the time interval between emitter 11 emitting the electromagnetic radiation and receiver 12 receiving the reflected electromagnetic radiation; and
- a computer 14 for determining the distances C, C', C" between points P and point Q on the basis of the time interval measured by chronometer 13.

In the example shown, emitter 11 is a laser diode comprising a laser transmission lens 15; and receiver 12 is a photodiode comprising a laser receiving lens 16.

Emitter 11 emits a number of laser beams 19, each forming an angle $\theta$ with a fixed axis (FIG. 1).

More specifically, computer 14 determines the distances between points P and receiver 12 on the basis of the time interval measured by chronometer 13, and determines distances C, C', C" between points P and point Q on the basis of geometric data of the helicopter.

Figure 5:
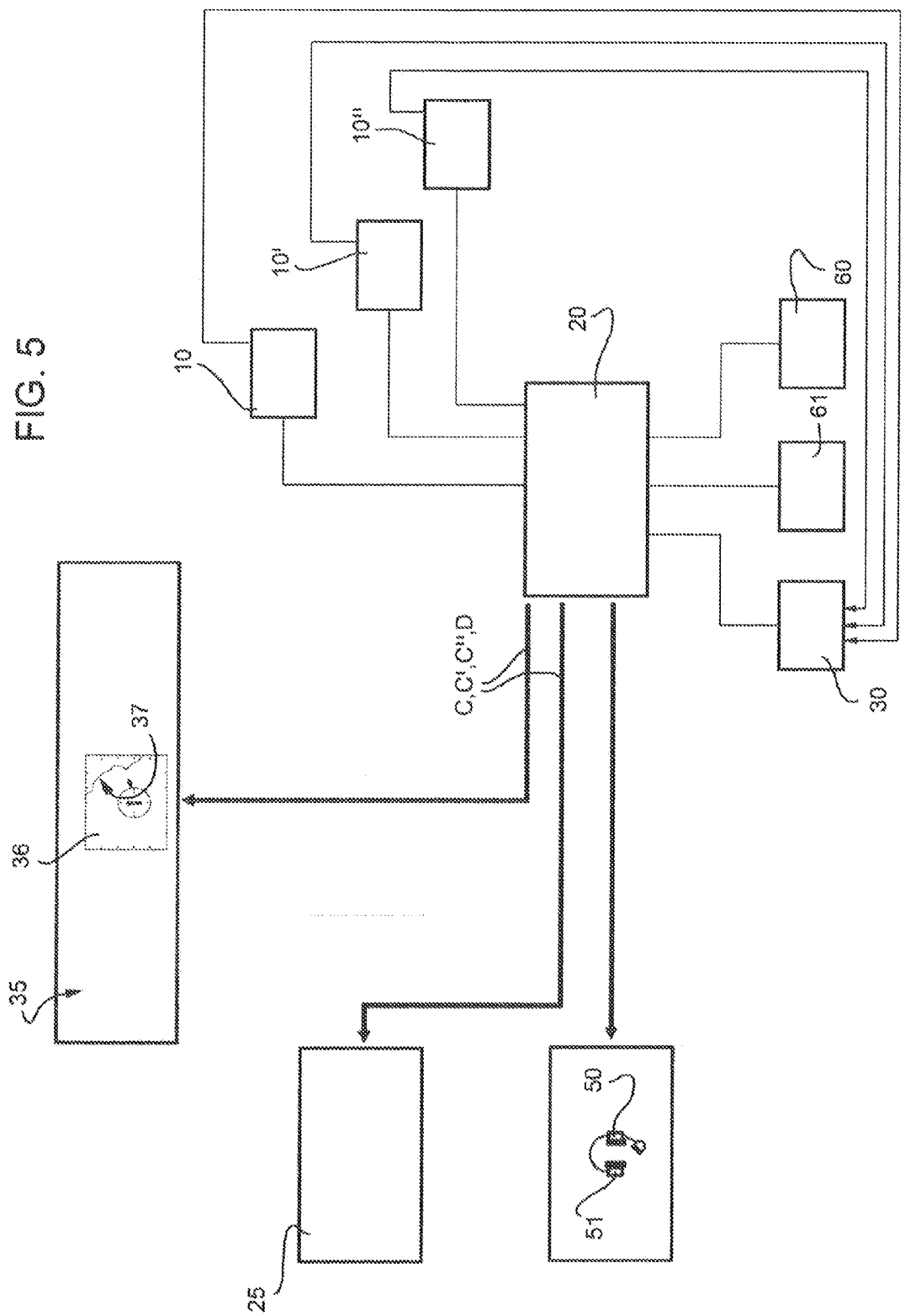
FIG. 5 shows an operating diagram of other parts of the FIGS. 1 and 2 aircraft.

Control unit 20 is also designed to determine, on the basis of distances C, C', C" measured by sensors 10, 10', 10", a recommended backoff direction D in which to pull the helicopter back from obstacle O (FIG. 5).

In a first embodiment of the present invention, direction D corresponds to the direction joining point Q and the point P on obstacle O closest to point Q.

In another embodiment of the present invention, direction D is determined by control unit 20 by taking into account the shape of obstacle O around the point P closest to point Q.

Safety region Z is preferably a circle with its centre at point Q.

More specifically, the radius of safety region Z equals the sum of:
- the distance between axis A and the tips of the blades of main rotor 3; and
- a safety distance.

The size of safety region Z is user-adjustable selectively, in particular by the pilot.

Preferably, the size of safety region Z is user-adjustable using a homothety, i.e. a transformation that preserves the angles between the tangents to two points on the contour of safety region Z.

For example, if safety region Z is a circle, the user can adjust the radius of the circle.

In other words, the user can set different maneuvering safety margins, i.e. the smaller the area of safety region Z, the lower the safety margin.

Helicopter 1 also comprises (FIG. 5):
- an autopilot system 25;
- a filter system 30 comprising a number of filters (not shown), which can be pilot-activated singly or in combination to attenuate noise or enhance the distance C, C', C" values acquired by sensors 10, 10', 10", so as to supply filtered distance C, C', C" values to the output of control unit 20; and
- a graphic interface 35 for displaying user information, and which is controlled by control unit 20 on the basis of the distance C, C', C" values acquired by sensors 10, 10', 10" and possibly filtered by filter system 30.

More specifically, control unit 20 is designed to command system 25 to pull the helicopter back from obstacle O when at least one point P on obstacle O lies within safety region Z.

Control unit 20 is preferably designed to command system 25 to translate the helicopter in direction D.

Each filter in filter system 30 substantially comprises a comparing stage (not shown) for comparing the distance C, C', C" values measured by sensors 10, 10', 10" between one or more points P and point Q; and a generating stage (not shown) for generating filtered distance C, C', C" values.

A first filter determines the presence of multiple electromagnetic radiation from the same angle $\theta$, and selects the highest distance C, C', C" value. The first filter serves to eliminate semitransparent objects, such as snowflakes, which give rise to multiple reflections.

A second filter receives the distance C, C', C" values measured by sensors 10, 10', 10" at consecutive instants from the same angle $\theta$; and the generating stage of the second filter generates a filtered distance C, C', C" value equal to the arithmetic mean, the movable mean, or the median of the above distance C, C', C" values.

A third filter receives the distance C, C', C" values of adjacent points P measured at the same instant by sensors 10, 10', 10"; and the generating stage of the third filter generates, for each angle $\theta$, a respective filtered distance C, C', C" value equal to a combination of the value measured at that angle $\theta$, and a function of values measured at further angles $\theta$.

A fourth filter comprises a comparing stage, which receives the distance C, C', C" values, and compares the distance C, C', C" values measured by sensors 10, 10', 10"

between the same points P and point Q; and a generating stage (not shown) for generating filtered distance C, C', C" values.

It is important to note that the fourth filter compares the distance C, C', C" values between point Q and points P lying in at least two overlapping sweep regions R of at least two respective sensors 10, 10', 10".

The comparing stage of the fourth filter is designed to
  evaluate, on the basis of a hypothetical three-dimensional, e.g. cylindrical, form of obstacle O, the distances C, C', C" of a number of same points P measured by sensors 10, 10', 10";
  compare the distance C, C', C" values measured by sensors 10, 10', 10" between same points P and point Q; and
  discard, for example, a distance value (e.g. value C) if it differs widely from the other values (C', C").

The fourth filter assumes a three-dimensional—in the example shown, cylindrical—form of obstacle O, so that each point P on obstacle O can be associated with a distance C from point Q measured by sensor 10, a distance C' from point Q measured by sensor 10', and a distance C" from point Q measured by sensor 10".

In other words, the fourth filter eliminates random errors in the distance C, C', C" values measured by sensors 10, 10', 10".

Figure 4:
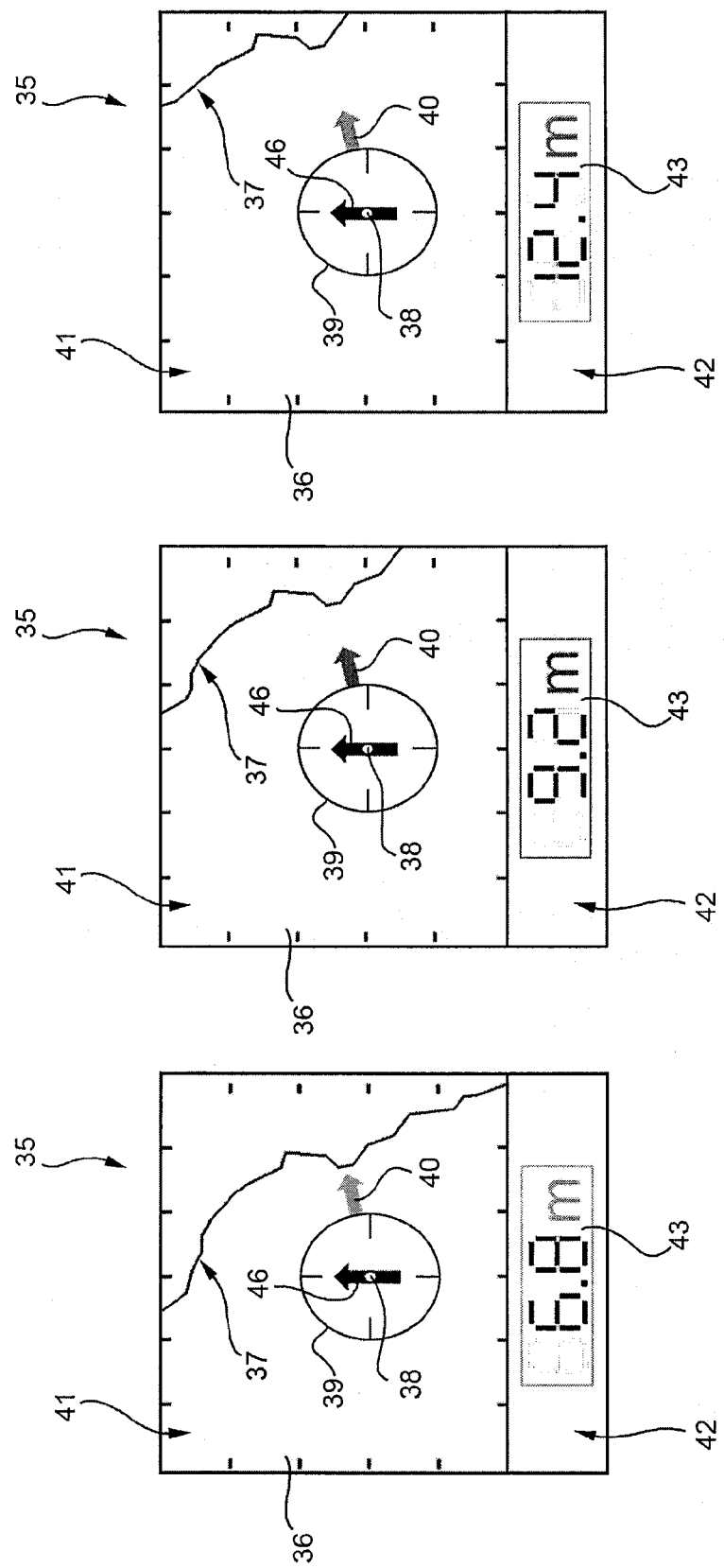
FIG. 4 shows a graphic interface of the FIGS. 1 and 2 aircraft.

Graphic interface 35 comprises a graphic display 36 for advantageously displaying (FIG. 4):
  an outline 37 representing the intersection of the outer surface of obstacle O and at least one of regions R;
  a point 38 indicating the position of point Q on the helicopter with respect to outline 37;
  an indication 39 in the form of a circle indicating the outline of disk 7 of rotor 3;
  an indication 46 of the overall size of the helicopter; and
  a vector 40 indicating direction D.

More specifically, vector 40 is parallel to direction D and goes from point Q towards obstacle O (FIG. 4) or from point Q away from obstacle O.

Graphic display 36 comprises a first area 41 showing outline 37, point 38, indications 39, 46, and vector 40; and a second area 42 showing an indication 43 of the lowest of the distance C, C', C" values measured by sensors 10, 10', 10" between point Q and points P.

Indication 43 may be shown in different colors, depending on the lowest distance value. For example, when the lowest distance value is below a lower threshold value, i.e. when point Q is particularly close to one of points P on obstacle O, indication 43 may be shown in red.

Conversely, when the lowest distance value is above an upper threshold value, i.e. when point Q is a good distance from obstacle O, indication 43 may be shown in green.

When the lowest distance value is between the upper and lower threshold values, indication 43 may be shown in yellow.

Control unit 20 is also designed to evaluate, on the basis of the distance C, C', C" values measured by sensors 10, 10', 10" and user-selectable values on graphic interface 35 (FIG. 9):
  a first set of first points P on obstacle O located a distance from point Q above a first user-selectable value;
  a second set of second points P on obstacle O located a distance from point Q below the first value and above a second user-selectable value;
  a third set of third points P on obstacle O located a distance from point Q below the second first value.

Control unit 20 is also designed to display on graphic display 36 (FIG. 9):
  an area 100 in a first color, e.g. green;
  an area 101 in a second color, e.g. yellow;
  an area 102 in a third color, e.g. red;
  an outline 103 bounding area 100 on the indication 39 side, and area 101 on the opposite side to indication 39;
  an outline 104 bounding area 101 on the indication 39 side, and area 102 on the opposite side to indication 39; and
  an outline 105 bounding area 102 on the indication 39 side, and partly coinciding with the outline of region Z.

Outline 103 comprises one or more—in the example shown, two—portions 110 representing points P on obstacle O located a distance above a threshold value from point Q, and may comprise one or more portions 111 connecting portions 110—in the example shown, by a first arc of a circle with its centre at point 38.

Outline 104 comprises one or more—in the example shown, two—portions 115 representing points P on obstacle O located a distance below a threshold value from point Q, and may comprise one or more portions 116 connecting portions 115—in the example shown, by a second arc of a circle with its centre at point 38 and smaller in radius than the first arc. Outline 104 shares opposite ends with outline 103.

Outline 105 shares opposite ends with outline 104.

Area 100 bounded by outline 103 thus represents an area of obstacle O a good distance from point Q and so posing no threat to the safety of the helicopter. Area 101 bounded by outlines 103 and 104 represents an area of obstacle O at an average distance from point Q. And area 102 bounded by outlines 104 and 105 represents an area in space close to obstacle O and from which the pilot must keep the helicopter away.

In the event of a malfunction of any one of sensors 10, 10', 10", control unit 20 is designed to indicate on display 36 the outline portion of obstacle O not swept by the malfunctioning sensor 10, 10', 10".

In the event of a malfunction of any one of sensors 10, 10', 10", control unit 20 is designed to indicate on display 36, on the basis of the distance C, C', C" values measured by the other sensors 10, 10', 10", a reconstructed outline of the outline portion of obstacle O not swept by the malfunctioning sensor 10, 10', 10".

Helicopter 1 also comprises a transducer 50 for generating a first acoustic signal inside a first earpiece of a user headset; and a transducer 51 for generating a second acoustic signal inside a second earpiece of the headset (FIG. 5).

Control unit 20 is also designed to:
  receive a signal—e.g. generated by an inertial platform integrated in the user headset and angularly integral with the first and second channel—associated with the angle between an axis integral with the user headset and a fixed axis; and
  command transmission, over transducers 50, 51 and also on the basis of the above signal associated with the above angle, of respective acoustic signals stereophonically representing direction D.

In one particular embodiment of the present invention, control unit 20 is designed:
  not to command transmission of any acoustic signal over transducers 50, 51 when the lowest of the distance C, C', C" values measured by sensors 10, 10', 10" between point Q and points P is above a first user-selectable threshold value;
  to command transmission of intermittent acoustic signals over transducers 50, 51 when the above lowest value is below the first threshold value and above a second user-selectable threshold value lower than the first threshold value; and
  to command transmission of steady signals over transducers 50, 51 when the above lowest value is below the second threshold value.

Control unit 20 is preferably designed to generate a number of further threshold values between the first and second threshold value, and to generate an acoustic hazard signal whenever the above lowest value is below a respective said further threshold value.

In other words, control unit 20 generates a number of hazard signals as the above lowest value falls from the first to the second threshold value as a result of the helicopter getting closer to obstacle O.

The further threshold values are not equally spaced between the first and second threshold value, but get denser towards the second threshold value.

Alternatively, when the traveling speed of the helicopter in direction D exceeds a given value, control unit 20 may generate a steady acoustic signal even when said lowest value is above the second threshold value.

Helicopter 1 also comprises:
  a detecting device 60 (FIG. 5), e.g. a GPS receiver, for determining the absolute position of a significant point, e.g. the centre of gravity, of the helicopter; and
  an inertial platform 61 (FIG. 5) for determining the absolute rotation angle between an axis integral with the helicopter and a fixed axis in space.

In other words, detecting device 60 and inertial platform 61 determine the three degrees of freedom defining the helicopter's movement in a plane parallel to the planes of sweep regions R of sensors 10, 10', 10".

On the basis of the time patterns of the position of the helicopter's center of gravity and the rotation angles between an axis integral with the helicopter and a fixed axis in space determined by detecting device 60 and inertial platform 61, control unit 20 is designed to evaluate a reference law of motion of the helicopter within a plane. The term reference law of motion is intended to mean the time pattern of the linear speed of the helicopter's center of gravity, linear acceleration of the helicopter's center of gravity, and angular speed and acceleration of the helicopter.

The reference law of motion is obtained by deriving the time pattern of the absolute center of gravity position determined by detecting device 60, and the time pattern of the rotation angle determined by inertial platform 61.

Control unit 20 is also programmed to:
  determine an actual law of motion of the helicopter on the basis of the time pattern of distances C, C', C" measured by sensors 10, 10', 10" between points P and point Q;
  compare the actual law of motion with reference laws of motion of the helicopter; and
  generate a malfunction signal, indicating malfunction of sensors 10, 10', 10", when a significant value, e.g. a norm, of the difference between the actual and reference laws of motion exceeds a given threshold value.

It is important to note that control unit 20 is designed to determine the actual law of motion of the helicopter assuming an obstacle O fixed in space.

Figure 6:
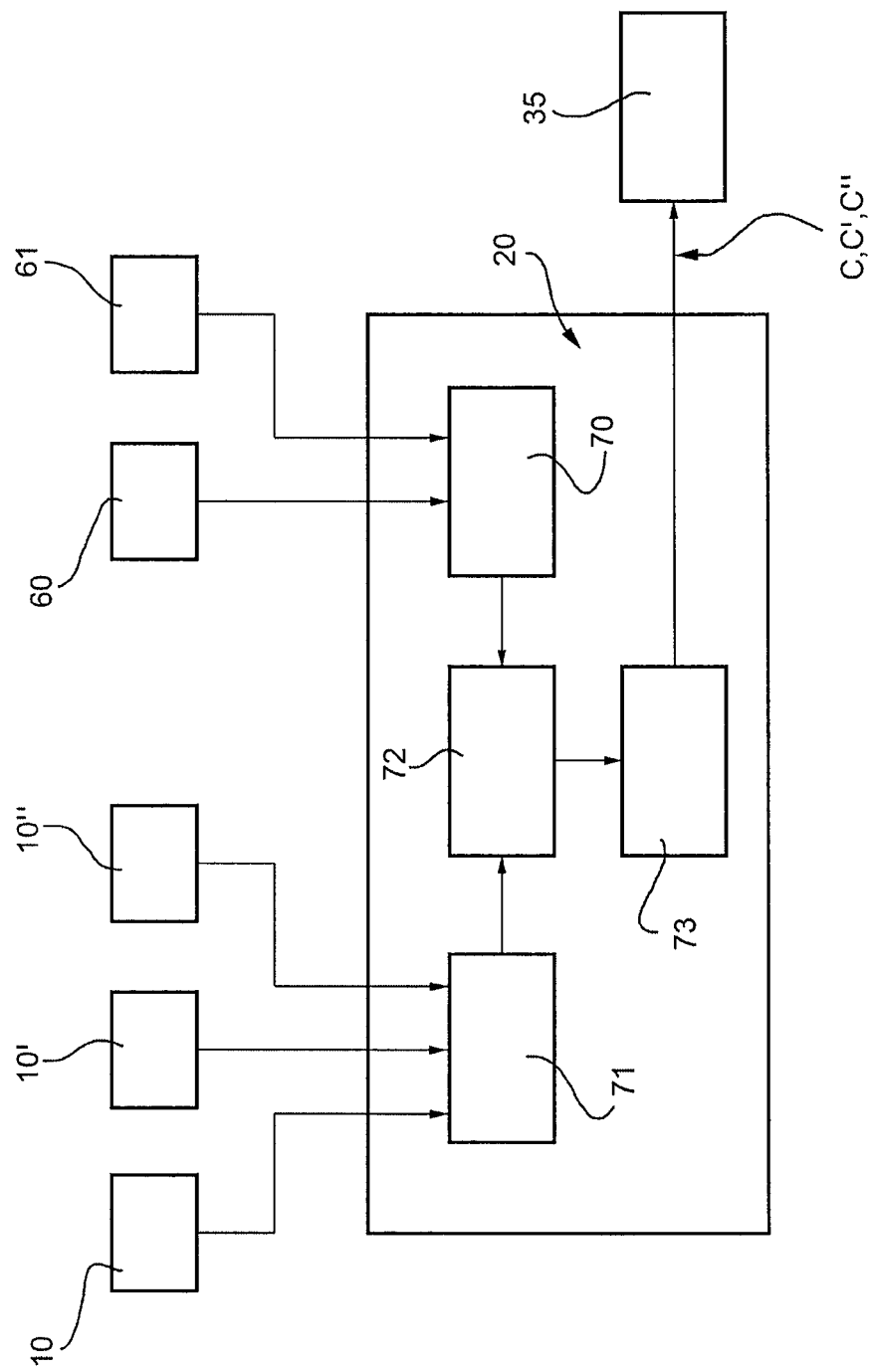
FIG. 6 shows a schematic of part of a control unit of the FIGS. 1 and 2 aircraft.

More specifically, control unit 20 comprises (FIG. 6):
  an evaluating stage 70 for evaluating the reference law of motion and controlled by detecting device 60 and inertial platform 61;
  an evaluating stage 71 for evaluating the actual law of motion and controlled by sensors 10, 10', 10";
  a comparing stage 72 controlled by evaluating stages 70, 71, and programmed to evaluate a significant value, e.g. a norm, of the difference between the reference and actual laws of motion; and
  a generating stage 73 controlled by comparing stage 72 and programmed to generate a malfunction signal, indicating malfunction of sensors 10, 10', 10", when the significant value calculated by comparing stage 72 exceeds a given threshold value.

Control unit 20 is also programmed to:
  compare the laws of motion determined by at least two sensors 10, 10' with the reference law of motion determined on the basis of the measurements by detecting device 60 and inertial platform 61; and
  accordingly generate a signal to correct at least one of sensors 10, 10'.

In other words, the absolute actual laws of motion are theoretically uncorrelated, which means any correlation between them may indicate the presence of system errors in the measurement of distances C, C', C" by sensors 10, 10', 10".

Control unit 20 determines any correlation by comparing the laws of motion determined by at least two sensors 10, 10' with the reference law of motion, and accordingly generates a signal to correct sensors 10, 10'.

Figure 7:
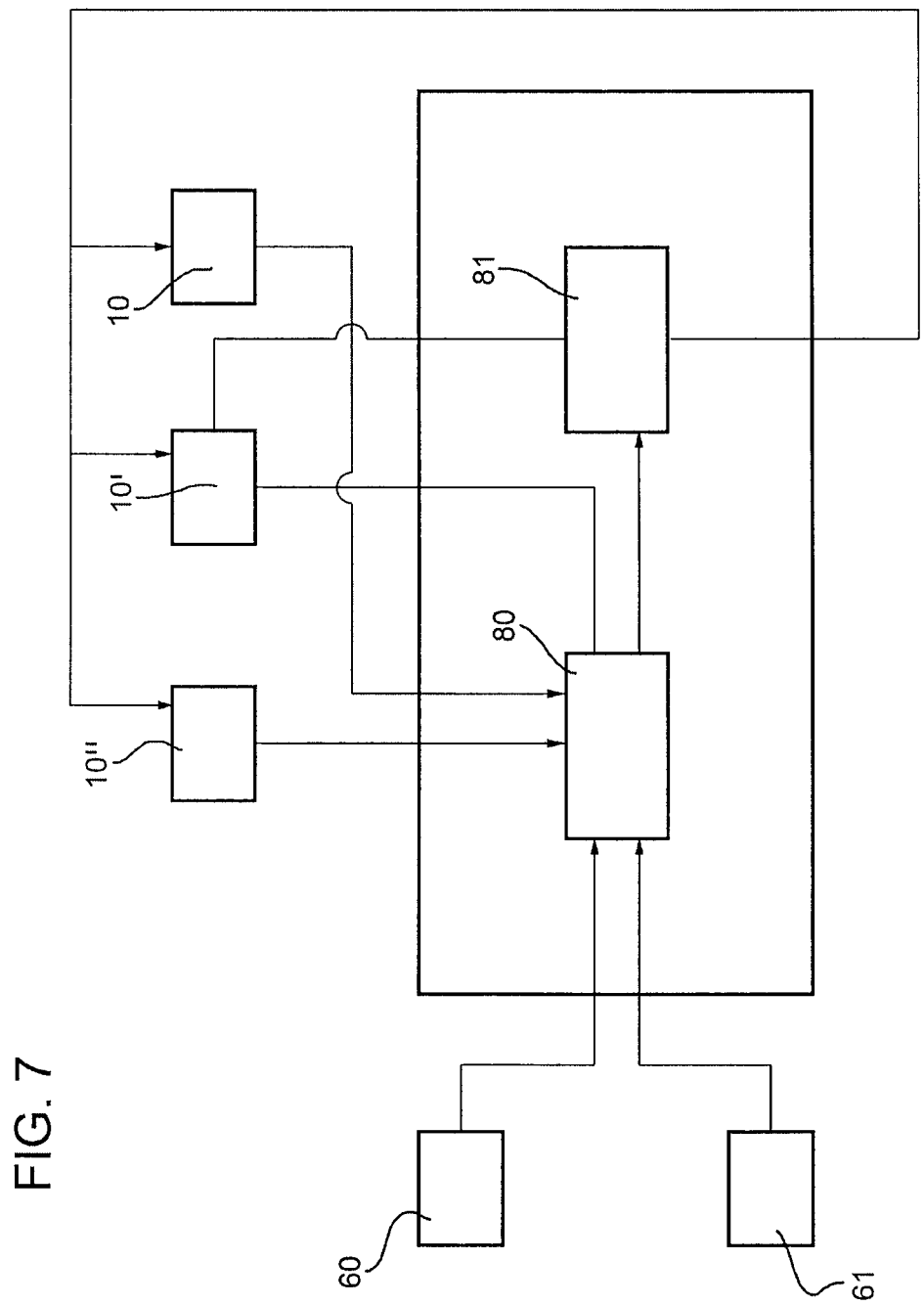
FIG. 7 shows a schematic of further parts of the FIG. 6 control unit.

For this purpose, control unit 20 comprises (FIG. 7):
  a comparing stage 80 controlled by at least two sensors 10, 10', by detecting device 60, and by inertial platform 61, and programmed to calculate the correlation between the law of motion determined on the basis of distances C, C', C" measured by sensors 10, 10', 10", and the reference law of motion determined on the basis of measurements by inertial platform 61 and detecting device 60; and
  a correction stage 81 controlled by comparing stage 80, and programmed to correct the distance C, C' measured by at least one of sensors 10, 10':

Software loaded and executed on control unit 20 controls graphic interface 35 and/or system 25 and/or filter system 30, and/or adjusts the size of safety region Z.

Operation of helicopter 1 will now be described as of a flying condition in which the traveling speed of the helicopter is substantially zero in a horizontal plane or a plane perpendicular to the up/down direction of the helicopter, e.g. during takeoff, landing, or a rescue and/or salvage operation.

The user, e.g. the helicopter pilot, selects a safety region Z area value for a given safety margin, and, if operating conditions call for it, may also activate one or more filters of filter system 30.

Sensors 10, 10', 10" sweep respective regions R to determine a number of distances C, C', C" between points P on obstacle O and point Q on the helicopter.

More specifically, laser radiation is emitted by emitter 11 of each sensor 10, 10', 10" into respective region R, and is reflected by points P on obstacle O to respective receiver 12.

Chronometer 13 of each sensor 10, 10', 10" measures the time lapse between emission and reception of the laser radiation, and computer 14 calculates distances C, C', C" between point Q and each point on obstacle O within the sweep regions R of sensors 10, 10', 10".

If the distance C, C', C" between at least one point P and point Q is such that point P lies within safety region Z, control unit 20 generates an alarm signal.

If autopilot system 25 is on, control unit 20 commands it to pull the helicopter back from obstacle O when at least one point P on obstacle O lies within safety region Z.

On the basis of distances C, C', C", control unit 20 also calculates a recommended backoff direction D.

In area 41 of display 36 of graphic interface 35, control unit 20 commands display of outline 37 representing the intersection of the outer surface of obstacle O and one of regions R; point 38 indicating the position of point Q with respect to outline 37; indication 39 representing disk 7 of rotor 3; vector 40 associated with direction D and directed from point 38 towards or away from outline 37; and indication 46 showing the overall size of the helicopter.

In area 42 of display 36, control unit 20 commands display of indication 43 showing the lowest distance C, C', C" value measured by sensors 10, 10', 10" between point Q and points P on obstacle O.

Control unit 20 preferably also commands display of areas 100, 101, 102 on display 36.

In one embodiment of the invention, control unit 20 also commands transmission over transducers 50, 51 of respective acoustic signals to provide the user with a stereophonic indication of direction D.

If autopilot system 25 is on, control unit 20 commands it to pull the helicopter back from obstacle O in a direction parallel to direction D.

In one particular embodiment of the invention, in the event of a fixed obstacle O, such as a mountain, control unit 20 calculates the actual law of motion of the helicopter on the basis of the time pattern of distances C, C', C" measured by sensors 10, 10', 10".

Control unit 20 also determines the reference law of motion of the helicopter on the basis of the helicopter center of gravity positions and the absolute rotation angles determined by detecting device 60 and inertial platform 61.

Finally, control unit 20 compares the helicopter's reference law of motion, determined on the basis of the measurements by detecting device 60 and inertial platform 61, with the helicopter's actual law of motion, determined on the basis of distances C, C', C" measured by sensors 10, 10', 10", and generates a malfunction signal when a significant value of the difference between the reference law of motion and the actual law of motion exceeds a given threshold value.

The user is thus alerted to the possibility of a malfunction of sensors 10, 10', 10".

Control unit 20 preferably determines a correlation between the actual law of motion determined by evaluating stage 71, and the helicopter's reference law of motion determined by evaluating stage 70, and accordingly corrects the values of distances C, C'.

The advantages of aircraft 1, the method, and graphic interface 35 according to the present invention will be clear from the above description.

In particular, sensors 10, 10', 10" (or the only one sensor 10, 10', 10") and control unit 20 automatically inform the user that at least one point P on obstacle O lies within safety region 2, i.e. that the helicopter is too close to obstacle O.

This therefore safeguards against potential collision situations caused by errors in judgment on the part of rescue/salvage operators in evaluating the position of the helicopter with respect to obstacle O, and/or by errors in communication between the pilot and the operator responsible for visually monitoring obstacle O.

Furthermore, sensors 10, 10', 10" (or the only one sensor 10) surrounding shaft 5, aircraft 1 may be efficiently used in a very particular operative scenario, i.e very close to fixed and/or moving obstacles and when the pilot searches the minimum distance between the obstacle and the aircraft 1. Typical examples of this scenario are taking off and/or landing in a ship, or carrying out rescue or salvage operations in emergency situations and/or poor-access locations, such as mountain or sea rescue operations.

As a matter of fact, in such cases, if aircraft 1 comes too close to obstacle O, there is the need to generate an alarm for the pilot who accordingly pulls the aircraft 1 back.

In this scenario, the sweep region of the sensor 10, 10', 10"—or of only one sensor 10, 10', 10"—is very close too the plane of main rotor 3. Accordingly, the sensors 10, 10', 10"—or only one sensor 10—detects the presence of obstacle O in a plane which is very close to and substantially coincides with the plane of main rotor 3.

Therefore, the presence of an obstacle very close to the main rotor is promptly detected and an alarm is accordingly generated.

The size of safety region Z being selectively adjustable, operation of control unit 20 can be user-adapted to different operating situations.

Selectively-activated filter system 30 enables the user to eliminate noise caused by particular atmospheric and/or operating conditions.

The recommended backoff direction D determined by control unit 20 is a valuable aid to the user in pulling back from obstacle O.

Graphic interface 35 is particularly advantageous by providing the user, on one instrument, with concise, easy-to-read indications of outline 37 of obstacle O, direction D, and the position of the outline of safety region Z with respect to obstacle O. All the information relative to direction D and the hazards involved in any given rescue/salvage operation can thus be absorbed immediately by the pilot with a minimum margin of error, which could be decisive in terms of safety.

The fact that control unit 20, in the case of a fixed obstacle O, compares the helicopter's actual law of motion, determined by sensors 10, 10', 10", with the reference law of motion means the pilot is alerted immediately of any malfunctioning of sensors 10, 10', 10".

By evaluating the correlation between the distances C, C' measured by at least two sensors 10, 10', and accordingly correcting the distance C, C' values, control unit 20 supplies the pilot and graphic interface 35 with an alarm signal and/or an extremely accurate indication of the recommended backoff direction with no system errors.

Clearly, changes may be made to the aircraft, method, and graphic interface 35 as described herein without, however, departing from the protective scope of the present invention.

In particular, the aircraft may comprise only one sensor 10 which surrounds shaft 5.

The invention claimed is:

1. An aircraft capable of hovering, comprising:
    a fuselage;
    a rotor mounted onto the top of said fuselage and which may rotate about an axis;
    a drive shaft projecting from said fuselage and for driving said rotor;
    a plurality of sensors, wherein said plurality of sensors surround said drive shaft and each of the plurality of sensors having a plane sweep region and designed, when said aircraft is maneuvering, to acquire values of respective distances between first points on an obstacle within the plane sweep region, and a second point on said aircraft, said second point being defined by the intersection of said axis with the plane of said rotor, and said sweep regions being substantially parallel to the plane of said rotor, during the hovering of said aircraft;
    a control unit designed to generate an acoustic and/or visual alarm signal when at least one of said first points lies within a safety region containing said second point on said aircraft, and said control unit is designed to determine a recommended backoff direction from said obstacle on the basis of said acquired values; and
    an autopilot system for automatically controlling the aircraft, said control unit being designed to control said autopilot system, on the basis of said acquired values, to pull said aircraft back from said obstacle when at least one of said first points lies within said safety region wherein said autopilot system is controllable by said control unit to move said aircraft away from said obstacle in a direction parallel to said recommended backoff direction.

2. The aircraft as claimed in claim 1, wherein the size of said safety region is selectively user-adjustable.

3. The aircraft as claimed in claim 1, comprising filter means selectively user-activated and in turn comprising:
a comparing stage for comparing said values acquired by at least one sensor of the plurality of sensors; and
a generating stage for processing said values acquired by at least one sensor of the plurality of sensors, and generating filtered values of the acquired values.

4. The aircraft as claimed in claim 1, comprising an autopilot system for automatically controlling the aircraft; said control unit being designed to control said autopilot system, on the basis of said acquired values, to pull said aircraft back from said obstacle when at least one of said first points lies within said safety region.

5. The aircraft as claimed in claim 1, comprising detecting means independent of said plurality of sensors and designed to determine a reference law of motion of said aircraft independently of a position of said obstacle;
said control unit being designed to determine an actual law of motion of said aircraft on the basis of said acquired values;
and said control unit also being designed to generate, in use, a malfunction signal, indicating malfunction of at least one sensor of the plurality of sensors, when a significant value of a difference between said reference law of motion and said actual law of motion exceeds a given threshold value.

6. The aircraft as claimed in claim 1, comprising display means; wherein said control unit is designed to command display on said display means of:
a first indication of said recommended backoff direction;
a second indication of the position of said second point;
a third indication of the overall size of said aircraft; and
a fourth indication of an outline of said obstacle defined as an intersection of said plane sweep region and an outer surface of said obstacle.

7. The aircraft as claimed in claim 1, comprising:
a first transducer for a first acoustic signal; and
a second transducer, for a second acoustic signal, separate from said first transducer;
said control unit being designed:
not to command transmission of any acoustic signal over said first transducer and second transducer when a lowest value of said distances measured by said at least one sensor is above a first user-selectable threshold value;
to command transmission of intermittent acoustic signal over said first transducer and second transducer when said lowest value is below said first user-selectable threshold value and above a second user-selectable threshold value; and
to command transmission of steady signals over said first transducer and second transducer when said lowest value is below said second user-selectable threshold value.

8. The aircraft as claimed in claim 7, wherein said control unit is designed to determine a recommended backoff direction from said obstacle on the basis of said acquired values and wherein said control unit is designed to command transmission, over said first transducer and second transducer, of an acoustic signal indicating said recommended backoff direction.

9. A method of assisting maneuvering of an aircraft capable of hovering, said maneuvering being carried out during a hovering of said aircraft, said aircraft comprising:
a fuselage;
a rotor mounted onto the top of said fuselage and which may rotate about an axis;
a drive shaft projecting from said fuselage and for driving said rotor;
the method comprising the steps of:
acquiring, when said aircraft is maneuvering, first values of respective first distances between first points on an obstacle within a sweep region of a first sensor of a plurality of sensors, and a second point on said aircraft, wherein said second point being defined by the intersection of said axis with the plane of said rotor and said sweep region being substantially parallel to the plane of said rotor during the hovering of said aircraft;
defining a safety region containing said second point on said aircraft;
generating an acoustic or visual alarm signal when at least one of said first points lies within the safety region containing said second point on said aircraft;
locating said plurality of sensors in a position in which they surround said drive shaft;
determining a first actual law of motion of said aircraft on the basis of said first values;
determining a reference law of motion of said aircraft-independently of said first values;
evaluating a significant value of the difference between said reference law of motion and said first actual law of motion;
generating a malfunction signal indicating malfunction of at least one of the plurality of sensors, when said significant value exceeds a given threshold value;
determining, when said aircraft is maneuvering, at least second values of respective second distances between second points on said obstacle within a second plane sweep region of a second sensor of the plurality of sensors;
determining a second actual law of motion of said aircraft on the basis of said second values;
determining a correlation between said first and second actual law of motion and said reference law of motion; and
correcting said first and/or second values on the basis of said correlation.

10. The method as claimed in claim 9, comprising the step of automatically controlling the movement of said aircraft on the basis of said first values, to pull said aircraft away from said obstacle when at least one of said first points lies within said safety region.

11. The method as claimed in claim 10, comprising the steps of:
determining a recommended backoff direction of said aircraft from said obstacle on the basis of said first values; and
automatically controlling the movement of said aircraft away from said obstacle in a direction parallel to said recommended backoff direction.

12. The method as claimed in claim 9, further comprising the steps of:
not commanding transmission of any acoustic signal over a first transducer and a second transducer when a lowest value of said distances measured by the first sensor is above a first user-selectable threshold value;
commanding transmission of an intermittent acoustic signal over said first transducer and said second transducer when said lowest value is below said first user-selectable threshold value and above a second user-selectable threshold value; and commanding transmission of steady signals over said first transducer and said second transducer when said lowest value is below said second user-selectable threshold value.

13. A software product on a non-transitory computer readable medium and designed, when executed, to implement the steps of a method as claimed in claim 9.

* * * * *